Jan. 13, 1925.
W. J. SPIRO
1,523,305
WAVE LENGTH INDICATOR
Filed April 23, 1924    2 Sheets-Sheet 1
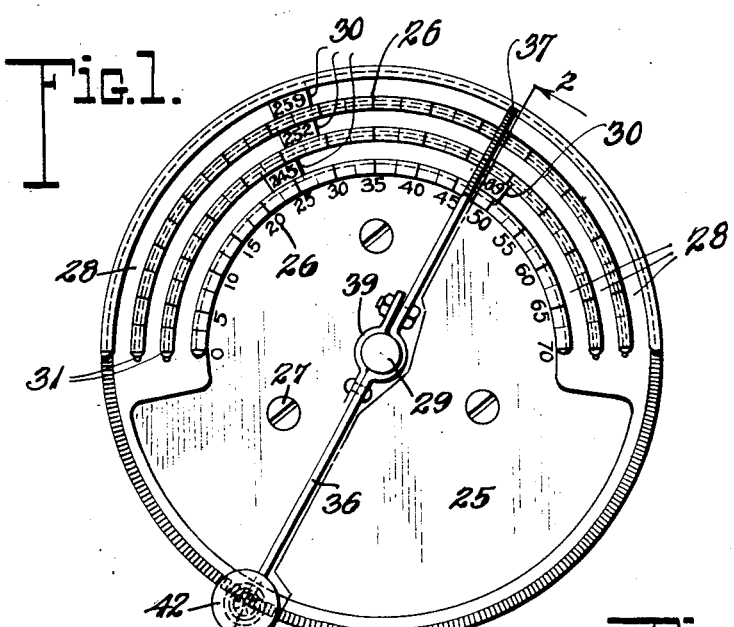
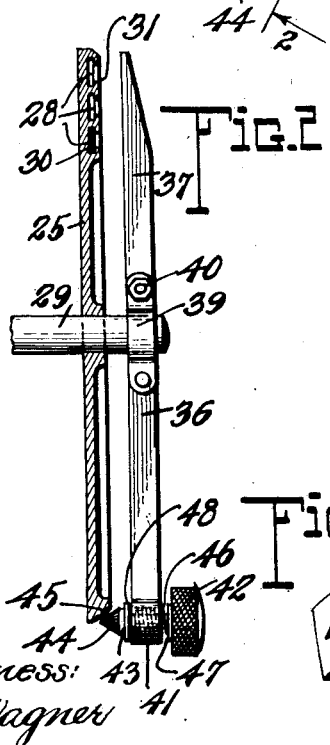
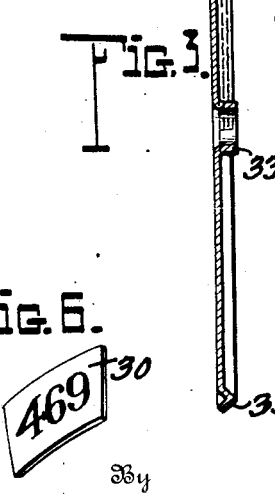
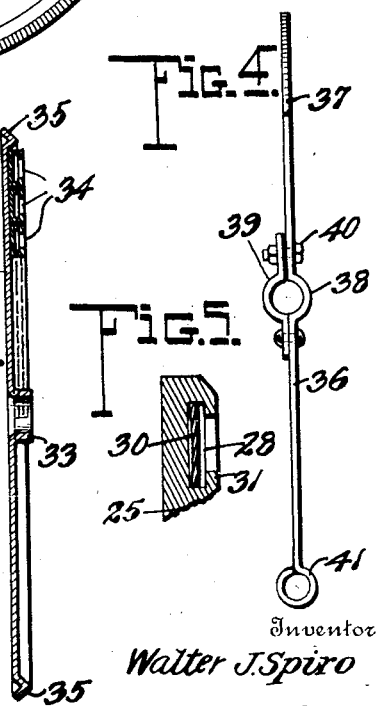
Inventor
Walter J. Spiro
Alfred T. Gage.
Attorney
Witness:
C. H. Wagner Jan. 13, 1925.　　　　　　　　　　　　　　　　　　　1,523,305
W. J. SPIRO
WAVE LENGTH INDICATOR
Filed April 23, 1924　　　　2 Sheets-Sheet 2
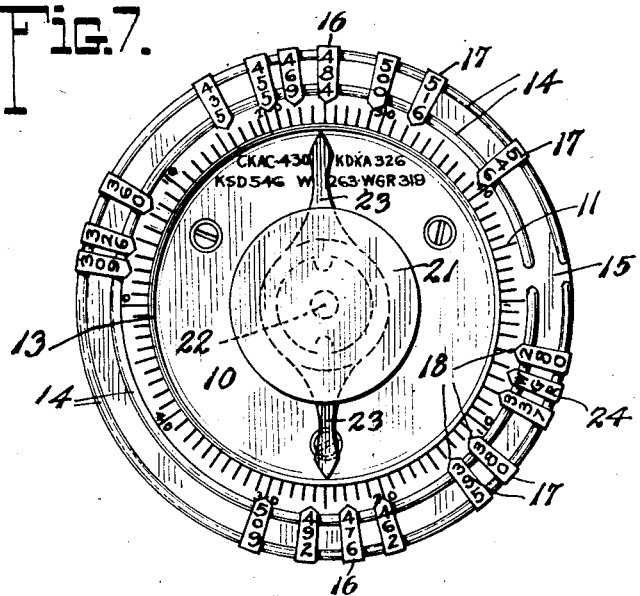
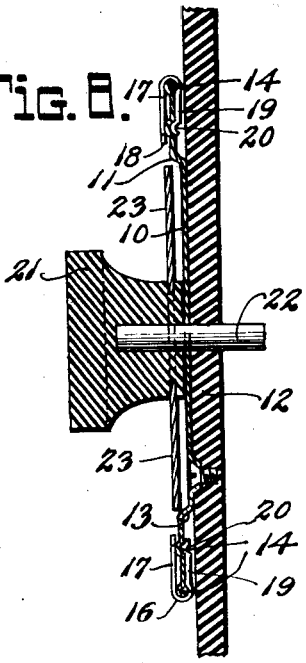
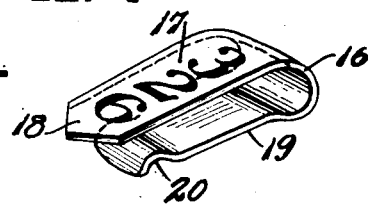
Inventor
Walter J. Spiro
Witness:

Patented Jan. 13, 1925.

1,523,305

UNITED STATES PATENT OFFICE.

WALTER J. SPIRO, OF WHITE PLAINS, NEW YORK.

WAVE-LENGTH INDICATOR.

Application filed April 23, 1924. Serial No. 708,450.

*To all whom it may concern:*

Be it known that I, WALTER J. SPIRO, citizen of the United States, residing at White Plains, in the county of Westchester and State of New York, have invented certain new and useful Improvements in Wave-Length Indicators, of which the following is a specification.

This invention relates to a wavelength indicator and particularly to a device adapted to replace the customary adjusting dial used upon radio receiving instruments.

The ordinary adjusting dial requires manipulation by an experienced operator to secure the best results in the receipt of the wave from a particular station, and this adjustment varies under different conditions of the instrument and atmosphere. It is therefore difficult for an inexperienced person to find the best point of adjustment for a particular station, and this invention provides a station indicator adjustable upon the dial when such point is found so that when the pointer is brought into alinement therewith the instrument may at a subsequent time be properly positioned for the most efficient reception from said station.

The invention has for an object to provide an improved form of indicator comprising a graduated dial having a curved slideway upon which indicators are adjustably mounted and retained in position to cooperate with a pointer upon the regulating member.

A further object of the invention is to present a new construction of dial having concentric circumferential slideways adapted to receive adjustably mounted indicators cooperating with a regulating pointer adapted to be alined with said indicators and the graduations upon the dial.

Another object of the invention is to provide a novel structure of indicator comprising a graduated dial and a cooperating pointer carried by the shaft of a regulating member, said pointer being provided with a rotatable friction member disposed to engage the dial to effect minute adjustment of the pointer relative to the dial.

Other and further objects and advantages of the invention will be hereinafter set forth and the novel features thereof defined by the appended claims, In the drawings—

Figure 1 is an elevation of the invention;

Figure 2 is a vertical section therethrough;

Figure 3 is a similar view of a modified form of dial;

Figure 4 is a detail of the pointer;

Figure 5 is a detail section of the slideway and indicator;

Figure 6 is a perspective of the indicator;

Figure 7 is an elevation of a modified form of the device;

Figure 8 is a vertical section therethrough; and

Figure 9 is a perspective of the indicator used therewith.

Like numerals refer to like parts in the several figures of the drawings.

The invention is adapted for application in various forms, two of which are herein disclosed, while the dial may be formed of any desired material or configuration and provided with indicating data adapted for the use to which it is applied. The device is herein shown as a wavelength indicator, but is not confined to such use, and the numeral 25 designates a dial plate provided with the usual graduations 26 and secured to an instrument panel by attaching devices 27, as shown. The periphery of this plate is formed with one or more slideways or tracks 28, and a preferable arrangement thereof is shown in Figure 1 where the slideways extend for a portion of the curcumference of the dial and form a segmental concentric series relative to the shaft 29 of a variable condenser or other tuning instrument.

These slideways 28 are preferably of a dovetailed cross section to retain in position the adjustable indicators or markers 30 which comprise thin plates slidably mounted in the ways. The ways may be formed by molding on the dial plate, as shown in Figure 3, and the overhanging top walls 31 produce the enclosing or dovetailed channels. If desired the dial may be constructed of sheet material, as in Figure 3, where the plate 32 is formed with a central aperture 33 and the slideways 34 applied and secured to the plate in segmental concentric series. The periphery of the plate is also formed with an angular serrated face 35 to cooperate with an adjusting device to be hereinafter described.

Upon the shaft 29 a pointer of any desired construction is secured and forms the means for adjusting the shaft for regulation of the instrument. A desirable form of such pointer is shown as comprising a plate 36 having a thin end 37 to cooperate with the dial indications and formed intermediate of its ends with a seat 38 to partially embrace the shaft to which it is secured by a clamping plate 39 and fastening device 40, as shown in Figures 2 and 4. At the end of the pointer opposite the indicating blade 37 a socket or sleeve 41 is formed to receive a rotatable adjuster 42 which has a shaft 43 extending therethrough and provided at its inner end with a conical friction face 44. This face is adapted to be engaged with an angular serrated or toothed face 45 at the periphery of the dial opposite the segment thereof provided with the indicator slideways. The adjuster is normally held out of contact with the serrated face by a spring 46 disposed within the socket and bearing against a face 47 on the shaft, while the outward movement of such shaft is limited by the flange 48 thereon.

In the use of this form of the invention the concentric arrangement of the slideways provides for the application of indicating plates where there is only a small variance in wave lengths and the dial graduations are extended to the ways to facilitate the proper sliding adjustment of the markers therein. Such an arrangement of the markers is shown in Figure 1, and the blade pointer is particularly adapted for cooperation with such fine adjustment.

In this construction the main adjustment is effected by swinging the pointer carried by the tuning shaft and the rotatable adjuster on the pointer forms a convenient handle for this purpose. When it is desired to effect a finer or more minute adjustment this rotatable adjuster is forced into contact with the serrated face of the dial and turned to the desired degree to effect in result a vernier adjustment of the pointer relative to the fixed dial. Immediately upon relief of the pressure upon this adjuster it is retracted from the dial face. This structure provides in a single member a pointer, handle and vernier adjusting device, while the dial forms a cooperating adjusting member and means for supporting an extended number of indicating markers in position relative to the setting graduations thereon.

In the modified form of the invention shown in Figures 7 to 9, the dial plate 10 is provided with graduations 11 and secured to an instrument panel 12. The periphery of the plate is offset to form a slideway 13 spaced from the panel and formed with concentric circumferential beads 14 which are interrupted at 15 to permit the introduction of the slidable indicators 16. These indicators are formed with an arm 17 terminating in a point 18, to cooperate with the graduations 11, and also with a parallel arm 19 formed with a friction head 20 disposed to seat in one of the grooves 14 to frictionally retain the indicator in position while permitting its free circumferential adjustment.

The adjusting handle 21 upon the shaft 22 of the tuning instrument is disposed centrally of the dial and formed with opposite pointers 23 disposed at 180 degrees apart to cooperate with the graduations 11 which are duplicated in the upper and lower segments of the dial to independently cooperate with the pointers.

In the operation of the invention the station marker bearing indicia of the wave length of the station desired is adjusted to the predetermined position upon the dial to secure the best results from such station. When this station is desired at a subsequent time it is only necessary to adjust the pointer into alinement with the marker, and all efforts to find the proper wavelength for radio receiving are thus avoided. The arrangement of the slideways upon the dial permits fine graduations for wavelengths and provides a support for markers carrying indicia of the metered wavelengths of different stations, as shown in Figures 1 and 7. The station markers instead of carrying the wave length numerals may be provided with the station call letters, as shown at 24 in the latter figure.

The invention is very simple in construction and adapted to be economically manufactured and conveniently applied to an instrument by merely removing the usual dial thereon. While the details of the invention have been specifically shown and described it is not confined thereto as changes and alterations may be made therein without departing from the spirit of the invention as recited in the following claims.

What I claim is—

1. A wavelength indicator comprising a dial, a regulating pointer cooperating therewith and carried by a radio tuning member, and a station indicator adjustably mounted upon the dial relative to the zero position of said pointer.

2. A wavelength indicator comprising a graduated dial having a peripheral track portion, a sliding station indicating member adjustably supported on said portion, and a centrally pivoted pointer cooperating with said member.

3. In a wavelength indicator, a plate provided with wave length graduations, a rotating pointer cooperating therewith, and a station indicator adjustably mounted upon said plate to cooperate with said graduations and pointer.

4. In a wavelength indicator, a plate provided with circumferential wavelength graduations, a regulating pointer movable within the arc of said graduations, and a station indicator adjustable upon the plate concentric to said graduations.

5. A wavelength indicator comprising a disk having a raised peripheral portion forming a plurality of circumferential slideways, sliding station indicating members supported in said ways, and a regulating means cooperating with the members in either of said ways.

6. A wavelength indicator comprising a dial provided with concentric slideways, a regulating pointer extended to cooperate with said slideways and carried by a radio tuning member, and independent station indicators adjustably mounted in the slideways to permit intimate location thereof and cooperation with said pointer.

7. In an indicator, a graduated dial provided with a segmentally disposed concentric series of slideways, indicating markers adjustably mounted in said slideways, an adjusting face upon said dial, and a regulating pointer adapted to cooperate with said markers and adjusting face.

8. In an indicator, a graduated dial provided with a frictional adjusting face, and a pivoted pointer having one end disposed to cooperate with said graduations and its opposite end provided with a rotatable adjuster to engage said face.

9. In an indicator, a graduated dial formed with a peripheral serrated face, a pivoted pointer having one end cooperating with said graduations, and an adjuster rotatably mounted in the opposite end of the pointer and having a friction face disposed to engage said serrated face.

10. In an indicator, a graduated dial formed with a peripheral serrated face, a pivoted pointer having one end cooperating with said graduations, an adjuster rotatably mounted in the opposite end of the pointer and having a friction face to engage the disk, and a spring for normally retracting the adjuster from the disk.

11. In an indicator, a graduated dial formed with a peripheral friction face, a pivoted pointer having a blade end cooperating with said graduations and a socket at its opposite end, and a rotary adjuster yieldingly mounted in said socket and provided with a friction face to engage the cooperating face upon the dial.

12. In an indicator, a graduated dial formed with an angular peripheral serrated face, a pivoted pointer, and an adjuster rotatably mounted thereon and formed with a conical friction face to engage the serrated face of the dial.

13. In an indicator, a dial plate provided with a concentric series of slideways disposed at one side of the center thereof, and a peripheral adjusting face at the opposite side of said center.

14. In an indicator, a dial plate provided with a concentric series of slideways disposed at one side of the center thereof and a peripheral adjusting face at the opposite side of said center, adjustable markers mounted in said slideways, a pivoted pointer cooperating at one end with said markers, and a rotating adjuster mounted in the opposite end of the pointer to engage said face.

15. In a wavelength indicator, a fixed dial plate provided with a concentric series of slideways disposed at one side of the center thereof and a peripheral adjusting face at the opposite side of said center, adjustable marking plates mounted in said ways, a pointer secured to a tuning shaft and cooperating at one end with said markers, and a rotatable adjuster yieldingly mounted in the opposite end of the pointer and forming an operating handle therefor.

In testimony whereof I affix my signature.

WALTER J. SPIRO.